(12) United States Patent
Elejalde et al.

(10) Patent No.: US 10,806,161 B2
(45) Date of Patent: Oct. 20, 2020

(54) DUAL STRUCTURE CRUNCHY GUM PELLET

(71) Applicant: INTERCONTINENTAL GREAT BRANDS LLC, East Hanover, NJ (US)

(72) Inventors: Cesar Carlos Elejalde, East Hanover, NJ (US); Zoltan Husz, Munich (DE); Serena Mueller, East Hanover, NJ (US); Sam Keegan, East Hanover, NJ (US); Simone Wieland, Munich (DE); Alexis Detavernier, Munich (DE); Ewelina Bogdan-Smigielska, Munich (DE); Joern Holm Hansen, Munich (DE)

(73) Assignee: INTERCONTINENTAL GREAT BRANDS LLC, East Hannover, NJ (US)

( * ) Notice: Subject to any disclaimer, the term of this patent is extended or adjusted under 35 U.S.C. 154(b) by 127 days.

(21) Appl. No.: 15/545,254

(22) PCT Filed: Feb. 2, 2016

(86) PCT No.: PCT/US2016/016065
§ 371 (c)(1),
(2) Date: Jul. 20, 2017

(87) PCT Pub. No.: WO2016/126642
PCT Pub. Date: Aug. 11, 2016

(65) Prior Publication Data
US 2018/0000110 A1    Jan. 4, 2018

Related U.S. Application Data

(60) Provisional application No. 62/238,880, filed on Oct. 8, 2015, provisional application No. 62/111,028, filed on Feb. 2, 2015.

(51) Int. Cl.
| | |
|---|---|
| *A23G 3/34* | (2006.01) |
| *A23G 3/54* | (2006.01) |
| *A23G 4/20* | (2006.01) |
| *A23G 3/36* | (2006.01) |
| *A23G 4/06* | (2006.01) |

(52) U.S. Cl.
CPC ............ *A23G 3/0063* (2013.01); *A23G 3/36* (2013.01); *A23G 3/54* (2013.01); *A23G 4/062* (2013.01); *A23G 4/20* (2013.01); *A23V 2002/00* (2013.01)

(58) Field of Classification Search
CPC ...... A23G 3/0063; A23G 3/0065; A23G 3/36; A23G 3/54; A23G 4/062; A23G 4/20
USPC ........................................................ 426/103
See application file for complete search history.

(56) References Cited

U.S. PATENT DOCUMENTS

| 4,317,838 | A | 3/1982 | Cherukuri et al. | |
|---|---|---|---|---|
| 5,478,593 | A * | 12/1995 | Serpelloni | A23G 3/2076 |
| | | | | 427/2.14 |
| 5,965,181 | A | 10/1999 | Barkalow et al. | |
| 6,303,159 | B2 | 10/2001 | Barkalow et al. | |
| 6,444,240 | B1 | 9/2002 | Barkalow et al. | |
| 7,810,446 | B2 | 10/2010 | Degady et al. | |
| 2001/0021373 | A1 | 9/2001 | Zyck et al. | |
| 2002/0086092 | A1 | 7/2002 | Niekerk et al. | |
| 2003/0198713 | A1 | 10/2003 | Clark et al. | |
| 2006/0233940 | A1 | 10/2006 | Huzinec et al. | |
| 2007/0110799 | A1 | 5/2007 | Leferve et al. | |
| 2007/0218165 | A1 | 9/2007 | Castro et al. | |
| 2009/0142444 | A1 * | 6/2009 | Jarrard, Jr. | A23G 3/0085 |
| | | | | 426/5 |
| 2009/0258109 | A1 | 10/2009 | Ortiz De Zarate | |
| 2010/0028521 | A1 | 2/2010 | Nieto et al. | |
| 2014/0199447 | A1 | 7/2014 | Elejalde et al. | |
| 2018/0000112 | A1 | 1/2018 | Elejalde et al. | |

FOREIGN PATENT DOCUMENTS

| EP | 2143336 A1 | 1/2010 |
|---|---|---|
| WO | 9109989 A1 | 7/1991 |
| WO | 0038532 A2 | 7/2000 |
| WO | 0115545 A1 | 3/2001 |
| WO | 0217731 A1 | 3/2002 |
| WO | 02076227 A1 | 10/2002 |
| WO | 2016126642 A1 | 8/2006 |
| WO | 2008016940 A1 | 2/2008 |
| WO | 2009050479 | 4/2009 |
| WO | 2011084759 A2 | 7/2011 |
| WO | 2012112515 A1 | 8/2012 |
| WO | 2012166785 A2 | 12/2012 |

OTHER PUBLICATIONS

European Patent Office, Extended European Search Report, Application No. 18175820.2-1105, dated Oct. 9, 2018 (10 pp.).
European Patent Office, EP Communication Pursuant to Article 94(3) EPC; Application No. 16 704 770.3-1105; dated May 2, 2019; pp. 1-5.
International Search Report for International Application No. PCT/US2016/016050; International Filing Date Feb. 2, 2016; dated Apr. 29, 2016; 7 pages.
International Search Report for International Application No. PCT/US2016/016065; International Filing Date: Feb. 2, 2016; dated May 2, 2016; 8 pages.
Written Opinion of the International Searching Authority for International Application No. PCT/US2016/016065; International Filing Date: Feb. 2, 2016; dated May 2, 2016; 7 pages.

(Continued)

*Primary Examiner* — Jyoti Chawla
(74) *Attorney, Agent, or Firm* — Cantor Colburn LLP (57) ABSTRACT

A coated confectionery is provided including a confectionery core and a shell surrounding said confectionery core. The shell includes a soft coating including at least one layer of a first coating material and a hard coating including at least one layer of a second coating material. The soft coating forms at least 25% of a total weight of said shell.

8 Claims, 4 Drawing Sheets

(56) References Cited

OTHER PUBLICATIONS

Written Opinion of the International Searching Authority for International Application No. PCT/ JS2016/016050; International Filing Date: Feb. 2, 2016; dated Apr. 29, 2016; 7 pages.
International Preliminary Report on Patentability for International Application No. PCT/US2016/016050, International Filling Date Feb. 2, 2016, dated Aug. 17, 2017, pp. 1-8.
PCT International Preliminary Report on Patentability; International Application No. PCT/US2016/016065; International Filing Date: Feb. 2, 2016; dated Aug. 8, 2017; pp. 1-8.
U.S. Non Final Office Action for Application No. 15/543,440, filed Jul. 13, 2017; dated Sep. 3, 2019; 14 pages.
Chinese Office Action; International Application No. 201680004885. X; filed Jul. 3, 2017; dated Jan. 16, 2020; 5 pages.
Chinese Office Action; International Application No. 201680005634. 3; filed Jul. 12, 2017; dated Jan. 21, 2020; 6 pages.

\* cited by examiner

DUAL STRUCTURE CRUNCHY GUM PELLET

CROSS REFERENCE TO RELATED APPLICATIONS

This application is a National Stage application of PCT/US2016/016065, filed Feb. 2, 2016, which claims the benefit of U.S. Provisional Application No. 62/111,028, filed Feb. 2, 2015, and U.S. Provisional Application No. 62/238,880, filed Oct. 8, 2015, all of which are incorporated by reference in their entirety herein.

FIELD

The disclosure relates generally to a confectionery, and more particularly, to a system and method for providing coating of the confectionery.

BACKGROUND OF THE INVENTION

Coated confectioneries, such as coated candies and coated chewing gums, are popular confectionery products. Typically, coated confectioneries are prepared via a panned coating process which is both time and energy consuming. Conventional methods of forming a coating on a confectionery are described in the background section of U.S. Pat. No. 7,810,446. For example, a conventional batch-type panning process commonly requires about 6-8 hours to coat a confectionery. Total coating time depends on a number of factors, such as, equipment, amount of desired coating, nature of ingredients etc.

In conventional chewing gum coating processes, a conditioned chewing gum center (also known as a chewing gum core) is coated with sweetener and/or sugar syrups. The sweetener-syrup is applied in successive layers, for example by spraying the sweetener-syrup on the chewing gum core. In conventional methods, after one layer of sweetener-syrup is applied, the layer is allowed to completely dry before the next layer of sweetener-syrup is applied. The sweetener-syrup layers crystallize and form a hard coating or shell around the chewing gum center. Since each sweetener-syrup layer needs to be dried and crystallized before the next layer can be applied, the sequential application of multiple sweetener-syrup layers is a time-consuming and energy intensive process.

During the drying step of the panning process, a low humidity hot air is applied. The air temperature cannot exceed the chewing gum core melting point in order to avoid deformation. The drying air temperature is usually between about 20-30° C. Drying at low temperatures takes longer than drying at higher temperatures, thereby extending the total time required for coating.

In view of the above challenges, it is noted that there is a need to provide new methods of rapidly coating chewing gum cores. The new method should be less time-consuming, require less energy, and should not adversely affect the final product quality in terms of sensory attributes and look-and-feel of the product.

BRIEF DESCRIPTION OF EMBODIMENTS OF THE INVENTION

According to one embodiment, a coated confectionery is provided including a confectionery core and a shell surrounding said confectionery core. The shell includes a soft coating including at least one layer of a first coating material and a hard coating including at least one layer of a second coating material. The soft coating forms at least 25% of a total weight of said shell.

According to another embodiment, a method of forming a coated confectionery includes providing a confectionery core and forming a soft coating about an exterior surface of said confectionery core. A hard coating is formed about the soft coating. A length of time required to form the hard coating is at least double a length of time required to form said soft coating.

According to yet another embodiment, a method of forming a coated confectionery includes providing a confectionery core and forming a soft coating about an exterior surface of said confectionery core. A hard coating is formed about the soft coating. A percentage of weight gain per hour achieved during formation of the soft coating is at least double a percentage of weight gain per hour achieved during formation of the hard coating.

According to one embodiment, a method of forming a coated confectionery includes providing a confectionery core and forming a soft coating about an exterior surface of said confectionery core. The soft coating includes one or more layers of a first coating material. Moisture is at least partially absorbed during formation of the soft. A hard coating is formed about the soft coating. The hard coating includes one or more layers of a second coating material.

These and other embodiments are described in detail below.

BRIEF DESCRIPTION OF THE DRAWINGS

The accompanying drawings incorporated in and forming a part of the specification embodies several aspects of the present disclosure and, together with the description, serves to explain the principles of the present disclosure. In the drawings.

The detailed description explains embodiments of the disclosure, together with advantages and features, by way of example with reference to the drawings.

DETAILED DESCRIPTION OF THE INVENTION

Figure 1:
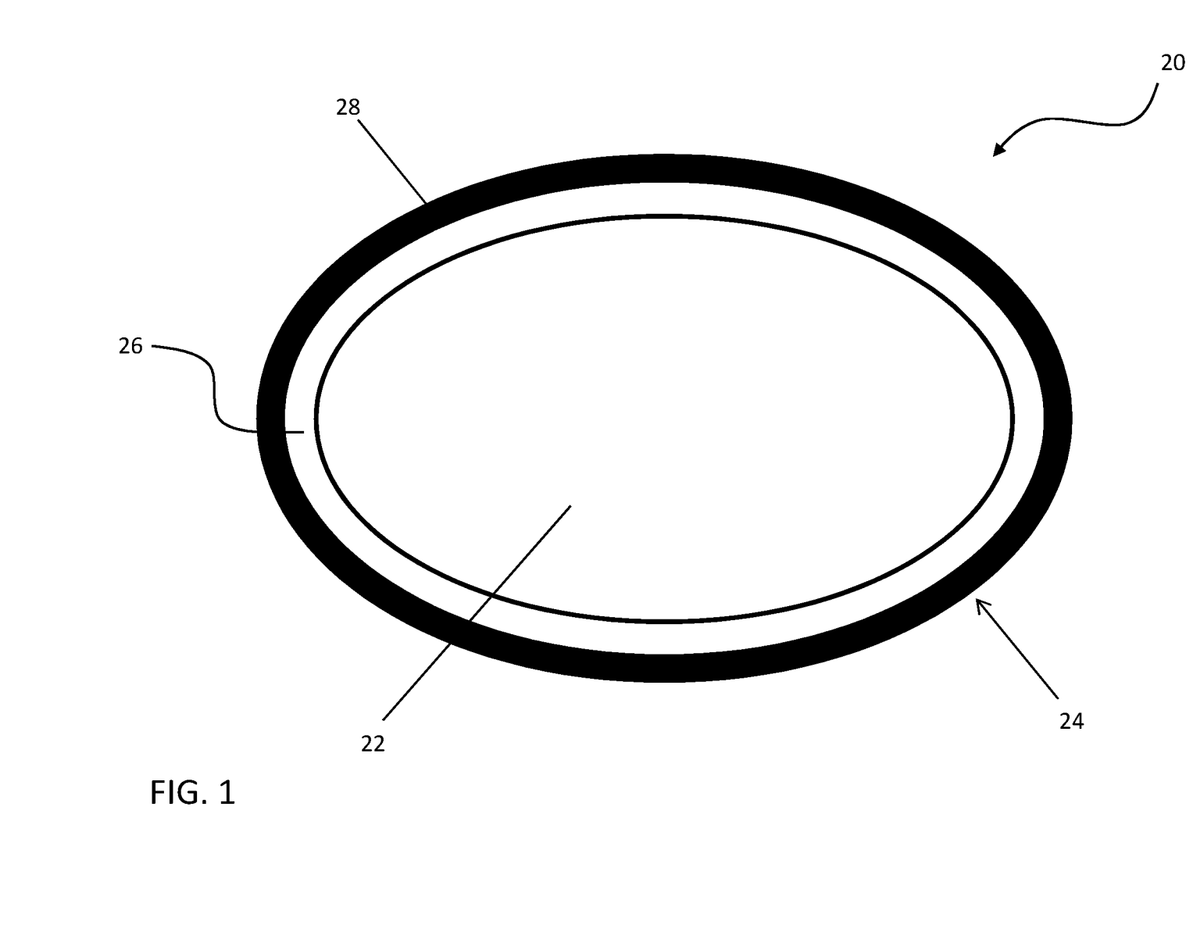
FIG. 1 is a perspective, cross-sectional view of a confectionery according to an embodiment.
Figure 2:
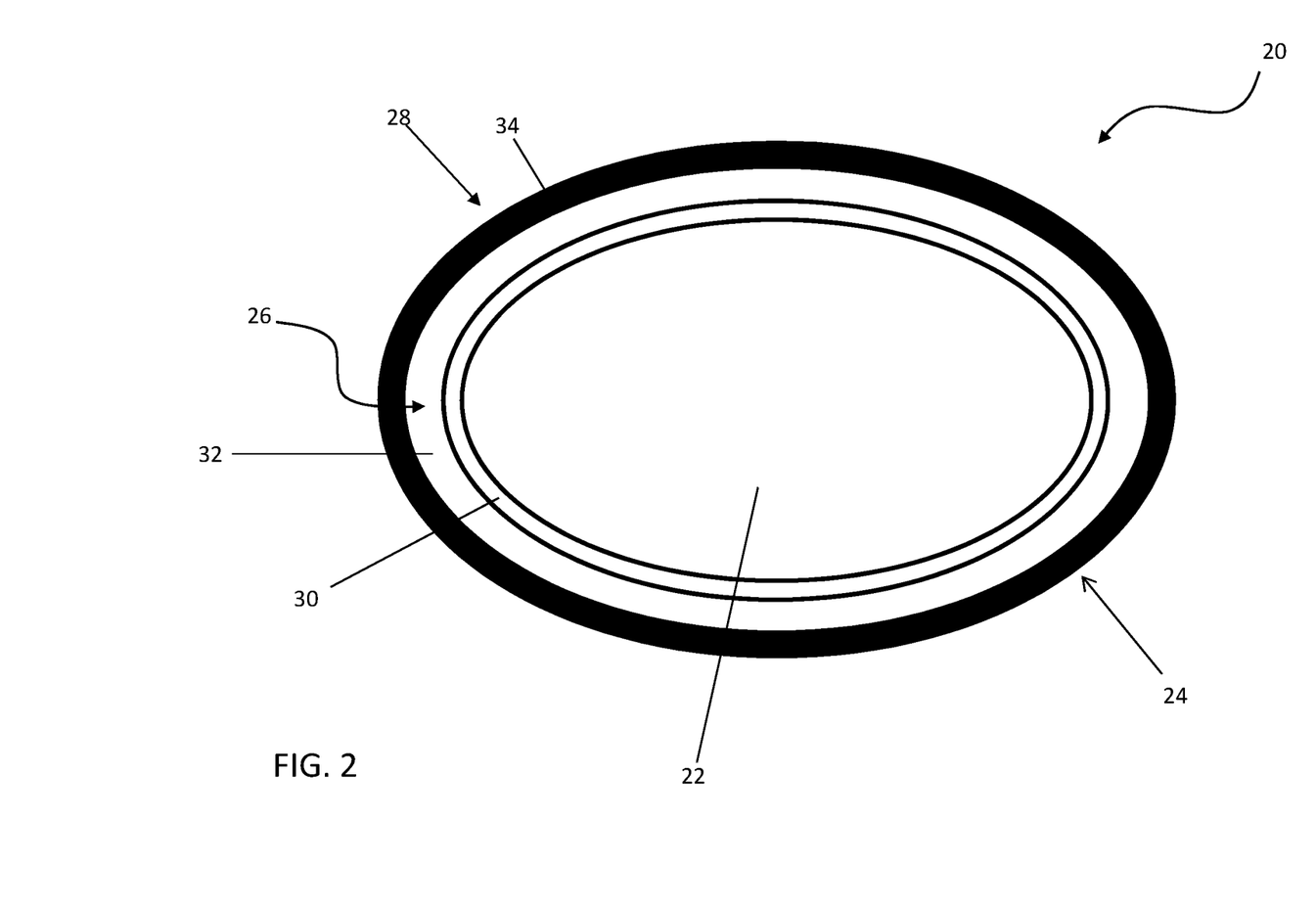
FIG. 2 is a perspective, cross-sectional view of another confectionery according to an embodiment.

Referring now to FIGS. 1 and 2, examples of a confectionery 20 according to an embodiment of the disclosure are illustrated. As shown, the confectionery 20 includes a core 22 formed from any suitable confectionery composition. The term "confectionery composition" as used herein is intended to include any edible product comprising a sweet component. Confectionery compositions may additionally include medicinal preparations made with sugar, syrup, sugar alcohol, honey, and sweet foods, such as candy or pastry for example. Confectionery compositions are well known in the art and include soft candy, chewy candy, hard candy, chewing gum, chocolate (including milk chocolate, dark chocolate, white chocolate, and semi-sweet chocolate for example, and lozenges, etc. In one embodiment, the confectionery core is a chewing gum composition.

Formed concentrically around the confectionery core 22 is a shell 24 including both a soft coating 26 and a hard coating 28. The soft coating 26 is located directly adjacent the confectionery core 22 and the hard coating 28 is arranged about the exterior of the soft coating 26. In one embodiment, the soft coating 26 is configured to form between about 25% and about 45% of the shell total weight and the hard coating 28 is configured to form about 55-75% of the shell total weight.

The soft coating 26 includes one or more layers formed by at least a first coating material 30. In one embodiment, illustrated in FIG. 1, the soft coating 26 is formed using only a single soft coating material. However, in other embodiments, the soft coating 26 may be formed via one or more layers of a plurality of coating materials. In the illustrated, non-limiting embodiment of FIG. 2, the soft coating 26 includes one or more layers of a first soft coating material 30 and one or more layers of a second soft coating material 32. Further, in embodiments where the soft coating 26 comprises both a first soft coating material 30 and a second soft coating material 32, of the 25-45% of the shell total weight formed by the soft coating 26, about 5% may be formed by the first soft coating material 30 such that the remaining 20-40% is formed by the second soft coating material 32. In addition, the hard coating 28 of the confectionery 20 includes at least one layer formed by a third coating material 34. Although the soft coating 26 is described as having a first soft coating material 30 and a second soft coating material 32, embodiments where the soft coating 26 includes any additional number of soft coating materials are also within the scope of the disclosure.

In one embodiment, particularly embodiments including a chewing gum core, each of the plurality of first soft coating material, second soft coating material, and third coating material includes a syrup, such as a first syrup, a second syrup, and a third syrup, respectively. Each of the first syrup, the second syrup, and the third syrup includes a sugar alcohol and water. In some embodiments any of the first syrup, second syrup, and third syrup may additionally include at least one of a binding agent and an emulsifier. One or more of the first syrup, second syrup, and third syrup may have the same composition. For example, the first syrup and the second syrup may have the same composition, but the third syrup may have a different composition. Alternatively, each of the first syrup, the second syrup, and the third syrup may have different compositions.

The sugar alcohols used in the first syrup, the second syrup, and the third syrup can be suitably chosen based on the desired properties of the syrups. Suitable sugar alcohols include maltitol, isomalt, sorbitol, xylitol, erythritol, mannitol, polyglucitols, polyglycitols, hydrogenated starch hydolysates, and combinations thereof. The sugar alcohol of at least one of the first syrup, second syrup, and third syrup may be the same or different from the remainder of the syrups. However, in some embodiments, different sugar alcohols may be used in each of the syrups. In addition, each of the first syrup, second syrup, and third syrup may include only one sugar alcohol, or alternatively, may comprise a combination of two or more sugar alcohols. In one embodiment, at least one of the first syrup, second syrup, and third syrup includes isolmalt. In another embodiment, at least one of the first syrup, second syrup, and third syrup includes xylitol.

As previously stated, any of the syrups may additionally include one or multiple suitable binding agents depending on the desired properties of the solution. Examples of suitable binding agents include gum arabic, pea starch, xanthan gum, carboxymethyl cellulose, methyl cellulose, hydroxypropylmethyl cellulose, starch, modified starches, inulin, konjac, chitosan, tragacanth, karaya, ghatti, larch, carageenan, alginate, chemically modified alginate, agar, guar, locust bean, psyllium, tara, gellan, curdlan, pullan, gelatin, pectin, and combinations thereof for example.

Similarly, the emulsifiers optionally used in the first syrup, the second syrup, and the third syrup can be suitably chosen based on the desired properties of the solution. Suitable emulsifiers include polysorbates (polyoxyethylene sorbitan esters), glyceryl monostearate, lecithin, a fatty acid monoglyceride, a diglyceride, propylene glycol monostearate, sugar esters, polyglycerol fatty acid esters, polyglycerol polyricinoleate (PGPR), monoglycerides and combinations thereof. Suitable polysorbates include polysorbate 20, polysorbate 40, polysorbate 60, and polysorbate 80. In some embodiments, the emulsifier used is polysorbate 60.

Figure 3:
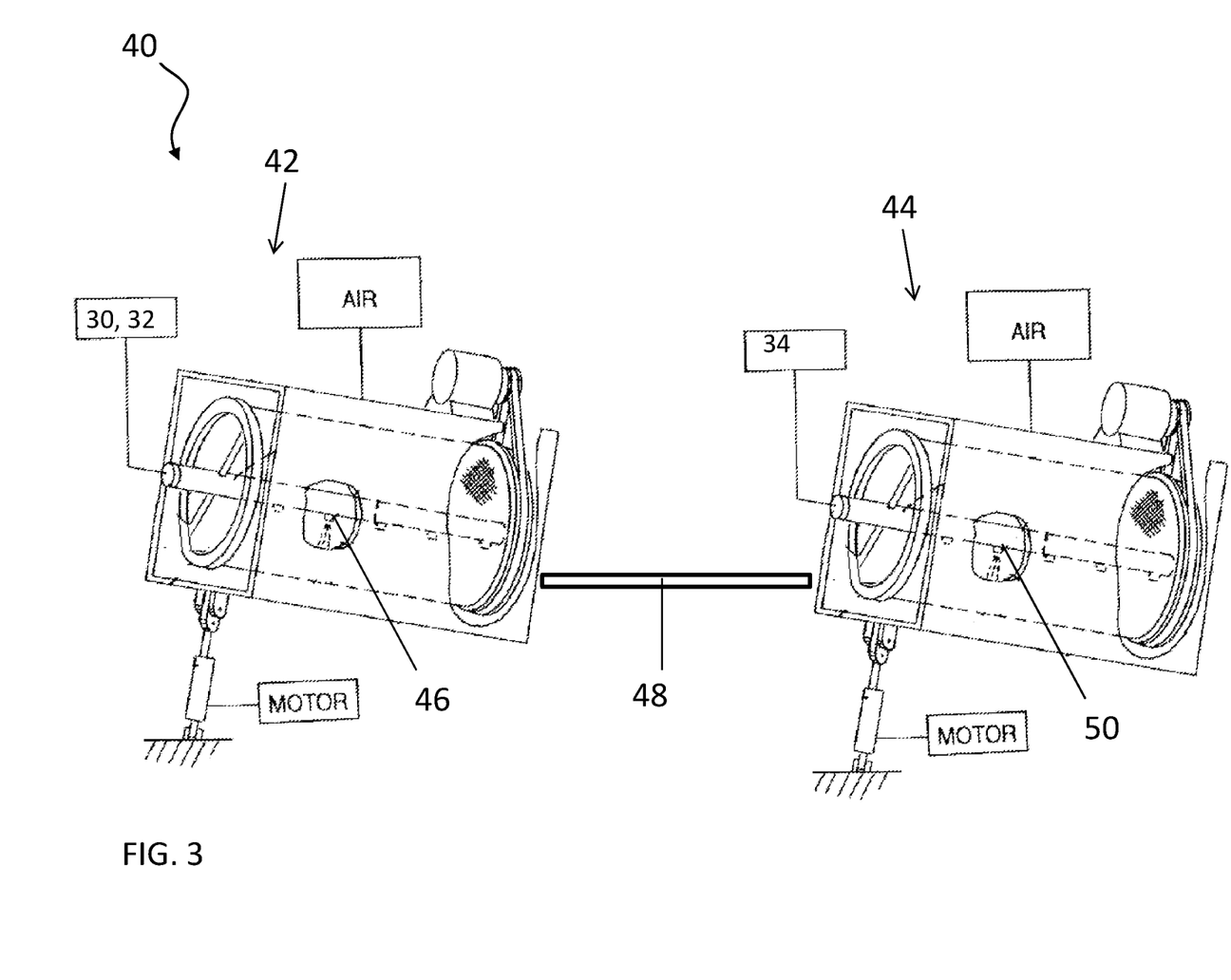
FIG. 3 is a schematic diagram of a system for manufacturing a confectionery according to an embodiment.

With reference now to FIG. 3, a system 40 and method of rapidly coating a confectionery core is illustrated and described in more detail. The method generally includes forming a soft coating 26 about the exterior surface of one or more confectionery cores 22. After formation of the soft coating 26, a hard coating 28 is then formed about the exterior of the soft coating 26. In one embodiment, formation of the soft coating 26 occurs at a first coating station 42 and formation of the hard coating 28 occurs at a second coating station 44, downstream from the first coating station 42. Although the second coating station 44 is illustrated and described as being arranged downstream from and in line with the first coating station 42, in other embodiments, the soft coating 26 and the hard coating 28 may be formed at the same coating station.

The first coating station 42 may include a mixer or rotating drum used in a conventional panning process. In one embodiment, the soft coating 26 is formed via a soft panning process by injecting a soft coating material, such as via a plurality of spray nozzles 46 for example, into the interior of the mixer. After applying the soft coating material 26, the confectionery cores 22 are transferred to the second coating station 44, such as via a conveyor 48 for example. The second coating station 44 may also include a mixer or rotating drum used in a conventional panning process. The hard coating 28 may be formed via a conventional panning process by injecting a hard coating material, such as via a plurality of spray nozzles 50 for example, into the interior of the mixer.

In embodiments where the soft coating 26 includes one or more layers of a first soft coating material 30, and one or more layers of a second soft coating material 32, the first soft coating material 30 is applied to the exterior surface plurality of confectionery cores 22. Application of the first soft coating material 30 is also commonly referred to as "gumming" or "binding" and generally takes less than 20 minutes to perform. The confectionery cores 22 may be cooled, such as to a temperature between about −10° C. and 10° C. for example, prior to processing and application of the first coating material 30. It has been determined that such pre-cooling may accelerate polymerization of the one or more binding agents within the first syrup.

Application of the first syrup is intended to prepare the confectionery core 22 for further processing by evenly distributing the first syrup. In one embodiment, the first syrup includes at least one binding agent, for example having a low viscosity at a high temperature, such that the first syrup forms a seal around the confectionery core 22. During application of the first syrup, cool process air is configured to blow over the first syrup and the confectionery core 22. The temperature of the process air during the application of the first syrup is generally lower than in conventional systems, for example between about 0° C. and about 20° C., more specifically between about 12° C. and 15° C. The adhesion tendency of the first syrup correlates to the temperature of the process air. When the first syrup contacts the surface of the confectionery core 22, the temperature of the first syrup drops causing jellification to begin. As a result, the first syrup is more able to stick and cool on the exterior surface of the confectionery core 22 without drying. In one embodiment, layers of the first coating material 30 are repeatedly applied to the cores 22 until a weight gain of between about 0.1 and 5% of the confectionery core 22 is achieved.

After application of the first soft coating material 30, one or more layers of a second soft coating material 32 are applied to the confectionery core 22 over the first coating material 30. Although shown as being applied in the same first coating station 42, in other embodiments, the second soft coating material 34 may be applied to the confectionery cores 22 at a separate, downstream coating station. Application of the second soft coating material 32 is configured to "build up" the weight and thickness of the shell 24 while minimizing process time. A polyol dusting may be applied to the confectionery cores 22 after the application of the first coating material 30, and prior to application of the second coating material 32. The dusting is intended to prevent the first syrup from interacting with the second syrup and causing the confectionery core 22 to stick to a surface of the mixer or panning drum.

The ingredients of the second soft coating material 32 and the process of applying the second coating material 32 may be optimized to achieve the highest level of crystallization and the shortest time required for drying. In one embodiment, the second syrup of the second coating material 32 is polyol based and has a limited amount of binding agent. To accelerate the building of the layers of the second coating material 32, a dry charge may be applied in a proportion of 5-15% of the weight of the confectionery core 22. Application of the second coating material 32 may be repeated until 20-40% of the desired total coating weight, including the hard coating, is achieved. Together, application of the first soft coating material 30 and the second soft coating material 32 requires less than an hour, for example about thirty minutes. In addition, water or other moisture is at least partially absorbed from the layers of soft coating 26, such as in combination with the polyol dusting or dry charge for example.

In one embodiment, at least one of the first soft coating material 30 and the second soft coating material 32 is applied via a high pressure spray nozzle. Use of a high pressure spray nozzle provides adjustability in both droplet size and spray pattern, without compromising the required flow. The droplet size may be particularly relevant in application of the second coating material 32. Application of the second soft coating material 32 via a high pressure spray nozzle helps to accelerate the spread, crystallization, and drying in order to achieve a continuous application where the drying time is minimized. By selecting an optimized droplet size, a significant amount of the liquid content within the second soft coating material 32 is able to evaporate during application such that a highly saturated second syrup comes into contact with the confectionery core 22 and crystallizes almost immediately. In one embodiment, a second soft coating material applied via high pressure application has an atomizing air pressure between about 0.1 and 10 bar and a fan air pressure between about 0.001 and 10 bar pressure.

After formation of the entire soft coating 26, the hard coating 28 is formed about the confectionery core 22. Formation of the hard coating 28, also referred to as "finishing," includes applying one or more layers of the third coating material 34 over the soft coating 26. Application of the third coating material 34 is configured not only to form a smooth homogeneous surface, but also to achieve desirable sensory properties of a finalized confectionery, such as crunch, color, and flavor for example. In one embodiment, formation of the hard coating 28 requires about four hours.

During the finishing phase of forming a confectionery, process air having a temperature between about 20° C. and about 50° C. is used to rapidly dry the third syrup. This process air is configured to aid in removal of moisture from the third coating material 34 via evaporation. In general, process air is only applied to the confectionery core 22 only until there is some residual moisture on the confectionery core 22 to avoid deformation. The amount of hydrocolloids and gum arabic in the third syrup plays an important role in selecting the temperature of the process air.

In one embodiment, the third coating material 34 includes one or more colorants configured to create a desired appearance of the confectionery 20. Colorants should generally only be included in the hard coating 28, specifically the third coating material 34, to avoid side effects of the colorant during the formation of the soft coating 26. Further, one or more flavorants may be applied to the exterior of the confectionery core 22 after the formation of the soft coating 26, such as prior to or during the initial formation of the hard coating 28.

Using this method, a crunchy coated confectionery 20 may be produced in less than about 5 hours. In one embodiment, formation of the soft coating 26 requires less than half the time required to form the hard coating 28. The new method described herein provides a significant time reduction compared to conventional batch panning methods. This overall reduction in time is achieved by replacing a portion of the hard coating 28 with the soft coating 26 via one of the processes described herein. The potential time reduction is specific to the actual product, ingredients used, and the amount of coating required. Nonetheless, the present inventors found that in most cases a 20-40% time reduction over conventional batch panned coating methods was possible.

Figure 4:
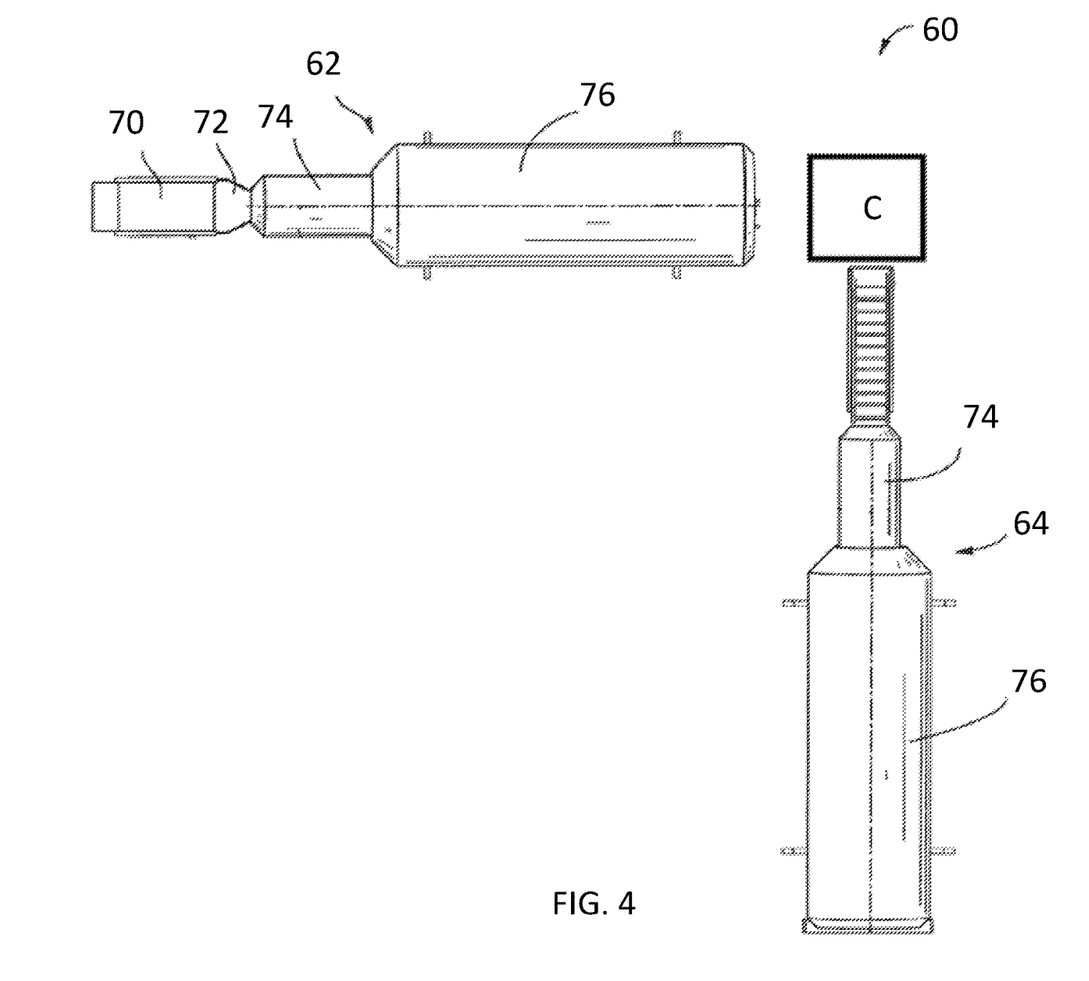
FIG. 4 is a schematic diagram of another system for manufacturing a confectionery according to an embodiment.

Referring now to FIG. 4, another system and method for rapidly coating a non-conditioned confectionery core 22 is illustrated. In this embodiment, the confectionery cores 22 are not cooled or conditioned before application of the soft coating 26. Similar to the system of FIG. 3, the system 60 generally includes forming a soft coating 26 about a confectionery core 22 at a first coating station 62 and forming a hard coating 28 about the soft coating 26 at a second coating station 64 arranged downstream from the first coating station 62. As shown in the FIG, a flow of confectionery cores 22 is provided from a feeder 70 to a chute 72 connecting the feeder 70 to the first coating station 62. During the manufacturing of the confectionery cores 22, no conditioning occurs after the confectionery is formed into a desired sheet, such as via a forming station for example, which is then scored and cut to form a plurality of individual pieces or cores 22. In some embodiments, forming of the confectionery additionally includes sizing the confectionery to a desired thickness. As a result, the confectionery cores 22 provided to the first drum coating station 62 are at a normal processing temperature.

In the illustrated, non-limiting embodiment, the first coating station 62 includes a first rotating drum 74 and a second rotating drum 76. In embodiments including a first soft coating material 30 and a second soft coating material 32, the one or more layers of the first soft coating material 30 may be formed about the exterior of the confectionery cores 22 in the first rotating drum 74 and the one or more layers of the second soft coating material 32 may be formed about the first soft coating material 30 in the second rotating drum 76. Although shown as being applied in the same first coating station 62, it should be understood that configurations of the system 40 that include separate coating stations for applying the first soft coating material 30 and the second soft coating material 32 are also within the scope of the disclosure.

These drums 74, 76 may be fixed relative to each other via any known affixing or locking mechanisms, the mechanism affixing the drums 74, 76 via connection to surfaces of the drums or structures supporting the drums. The first drum 74 defines a first drum volume and the second drum 76 defines a second drum volume 42. The first and second drum volumes communicate via insertion of an end of the first drum 74 into a portion of the second drum 76 that tapers down to an inlet opening thereof, allowing the confectionery cores to flow from the first drum 74 into the second drum 76. This insertion of the end of the first drum 74 into the inlet opening of the second drum 76 also forms an annulus between the first and second drums 74, 76.

In the illustrated, non-limiting embodiment, the second drum volume is greater than the first drum volume, such as via a greater diameter and/or length of the second drum 76 relative to the first drum 74. As a result, during transport of the cores 22 from an inlet in the first drum 74 to an outlet of the second drum 76, the cores 22 will have a longer residence time in the second drum volume than the first drum volume. However, other configurations, such as where the drum volumes are even or where the first drum volume is greater than the second drum volume are also within the scope of the disclosure. A coating station, such as but not limited to those further described in U.S. patent application Ser. No. 14/119,935, which is herein incorporated by reference in its entirety, is contemplated herein. After application of the soft coating 26, the confectionery cores 22 may be collected, such as in trays for example, and placed in a conditioning room, illustrated schematically at C, for a desired period of time. The conditioning room C has at least one of a controlled temperature and humidity. By positioning the confectionery cores 22 having the soft coating 26 within the conditioning room C for a desired period of time, the hardness of both the core 22 and the soft coating 26 is increased. After being conditioned, the confectionery cores 22 are provided to the second coating station 64 where one or more layers of a hard coating material 34 are applied about the soft coating 26 to form a hard coating 28. The second coating station 64 may have a configuration similar to, or different from the configuration of the first coating station 62, as shown in FIG. 4.

By applying the soft coating 26 to non-conditioned cores 22, the diameter of at least one of the drums 74, 76 of the first coating station 62 is sized to generate just enough mixing to apply a desired amount of soft coating 26. This reduction in the diameter of at least one coating drum results in less damage to the cores 22 as they rotate there through.

The rate at which the soft coating 26 is applied to the confectionery core 22, or more specifically, the percentage of weight gain per hour achieved during application of the soft coating 26 is approximately double the percentage of weight gain per hour achieved during a conventional panning process. Further, because the hard coating 28 may be applied in a manner similar to the conventional panning process, the percentage of weight gain per hour achieved during application of the soft coating 26 to a confectionery core 22 is about double the percentage of weight gain per hour achieved during application of the hard coating 28 to a confectionery core 22.

It has also been determined that the confectioneries 20 coated by the rapid coating methods described have texture, hardness, and sensory properties substantially similar to conventional hard pan coated confectioneries. A confectionery 20 including a soft coating 26 and a hard coating 28 as described herein, has a hardness similar to the hardness of a confectionery formed using a conventional panning process. Hardness is identified as the maximum force applied to the exterior surface of the confectionery 20. In some embodiments, the rapidly coated confectionery possesses at least 80% of the hardness of a conventional hard pan-coated confectionery having a similar or identical coating composition and the same total coating thickness at 100% penetration of the coating wherein the hardness was measured within two days of producing the rapidly coated confectionery. More specifically, it was found that the rapidly coated confectionery possessed at least 90% of hardness of a conventional hard pan-coated confectionery having the same total coating thickness at 100% penetration of the coating wherein the hardness was measured within two days of producing the rapidly coated confectionery.

The aesthetic and hardness results as described herein with respect to confectioneries 20 having a shell 24 wherein about 25-45% of the shell total weight is formed by the soft coating 26 and about 55-75% of the shell total weight is formed by the hard coating 28 are unexpected. Layering of multiple coating materials, particularly coating materials including one or more different sugar alcohols is expected to form a shell 24 having less desirable sensory attributes such as an undesirable exterior surface having less crunch or almost no crunch compared to a conventional hard coat confectionery. However, a confectionery 20 as described herein generally has a uniform, smooth outer surface with similar or even improved hardness compared to conventional hard-panned confectioneries.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A coated confectionery, comprising:
   a confectionery core; and
   a shell surrounding said confectionery core, said shell including:
      a soft coating including at least one layer of a first coating material and at least one layer of a second coating material; and
      a hard coating including at least one layer of a third coating material, wherein said at least one layer of said second coating material forms 20-40% of a total weight of the shell.

2. The coated confectionery according to claim 1, wherein said hard coating forms at least 55% of said shell total weight.

3. The coated confectionery according to claim 1, wherein said first coating material includes a first syrup, said second coating material includes a second syrup, and said third coating material includes a third syrup.

4. The coated confectionery according to claim 3, wherein at least one of said first syrup and third syrup includes a sugar alcohol.

5. The coated confectionery according to claim 1, wherein said confectionery core is conditioned between application of said soft coating and said hard coating.

6. The coated confectionery according to claim 1, wherein said soft coating forms at least 25% of a total weight of said shell.

7. The coated confectionery according to claim 1, wherein said second coating material includes a dry charge.

8. The coated confectionery according to claim 7, wherein said second coating material includes isomalt.

* * * * *